(12) United States Patent (10) Patent No.: US 10,563,863 B2
Murakami (45) Date of Patent: Feb. 18, 2020

(54) COMBUSTION SYSTEM

(71) Applicant: KAWASAKI JUKOGYO KABUSHIKI KAISHA, Kobe-shi, Hyogo (JP)

(72) Inventor: Kengo Murakami, Tokyo (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 52 days.

(21) Appl. No.: 15/535,107

(22) PCT Filed: Dec. 11, 2015

(86) PCT No.: PCT/JP2015/084788
§ 371 (c)(1),
(2) Date: Jun. 12, 2017

(87) PCT Pub. No.: WO2016/093341
PCT Pub. Date: Jun. 16, 2016

(65) Prior Publication Data
US 2017/0356648 A1 Dec. 14, 2017

(30) Foreign Application Priority Data
Dec. 12, 2014 (JP) .................................. 2014-251899

(51) Int. Cl.
*F23L 15/00* (2006.01)
*F23L 13/00* (2006.01)
(52) U.S. Cl.
CPC ............... *F23L 15/00* (2013.01); *F23L 13/00* (2013.01); *F23D 2205/00* (2013.01);
(Continued)

(58) Field of Classification Search
CPC ....................................................... F23L 15/00
See application file for complete search history.

(56) References Cited

U.S. PATENT DOCUMENTS 4,274,587 A 6/1981 Cioffi et al.
4,321,034 A * 3/1982 Taccone .................... F23D 1/02
110/106

(Continued)

FOREIGN PATENT DOCUMENTS

JP S62-46109 A 2/1987
JP H01-240608 A 9/1989

(Continued)

OTHER PUBLICATIONS

JPH01240608—machine translation (Year: 1989).*
Mar. 15, 2016 International Search Report issued in Patent Application No. PCT/JP2015/084788.

*Primary Examiner* — Nathaniel Herzfeld
(74) *Attorney, Agent, or Firm* — Oliff PLC

(57) ABSTRACT

A combustion system is capable of using a petroleum pitch fuel, and is provided with a burner having a fuel supply pipe where a flame stabilizing plate is formed in a tip end of the same, and a high temperature maintaining unit for maintaining an atmosphere temperature at a vicinity of the flame stabilizing plate during operation higher than a softening point of the petroleum pitch fuel. Thus, even when the petroleum pitch is used as fuel, the burner does not become unusable due to adhesion/solidification of the petroleum pitch inside the burner and combustion operation can be continued for a long time.

10 Claims, 12 Drawing Sheets

(52) U.S. Cl.
CPC .............. *F23D 2214/00* (2013.01); *F23D 2900/00016* (2013.01); *F23D 2900/11401* (2013.01)

(56) References Cited

U.S. PATENT DOCUMENTS

| | | | | |
|---|---|---|---|---|
| 4,946,475 | A * | 8/1990 | Lipp | ............... C10J 3/506 239/132.3 |
| 2005/0019715 | A1 * | 1/2005 | D'Agostini | ............ F23C 7/004 431/4 |
| 2005/0120927 | A1 * | 6/2005 | Okazaki | ................... F23D 1/00 110/261 |
| 2011/0146546 | A1 | 6/2011 | Morin et al. | |
| 2011/0197829 | A1 * | 8/2011 | Suemitsu | ................. F23C 5/08 122/235.26 |
| 2013/0098278 | A1 * | 4/2013 | Wang | ...................... F23D 1/00 110/265 |

FOREIGN PATENT DOCUMENTS

| | | |
|---|---|---|
| JP | H05-272711 A | 10/1993 |
| JP | H09-26112 A | 1/1997 |
| JP | H11-132414 A | 5/1999 |
| JP | 2009-299977 A | 12/2009 |
| JP | 2010-139176 A | 6/2010 |
| JP | 2012-112569 A | 6/2012 |
| JP | 2015-124990 A | 7/2015 |

\* cited by examiner

COMBUSTION SYSTEM

TECHNICAL FIELD

The present invention relates to a combustion system in which a petroleum pitch (petroleum residue) fuel can be used.

BACKGROUND ART

A boiler in a thermal power generation plant is a typical example of conventional combustion furnaces. Most boilers used there are coal burning boilers whose fuel is pulverized coal or petroleum burning boilers whose fuel is petroleum.

In the coal burning boiler, pulverized coal made by pulverizing coal is charged into a combustion furnace via a pulverized coal supply pipe of a pulverized coal burner using a transport gas. While, a combustion air is charged also into the combustion furnace through a path around the pulverized coal supply pipe. Note that, since a compressed air is normally used as a transport gas for transporting the pulverized coal, the compressed air also contributes to combustion in the combustion furnace.

In the pulverized coal burner, an air flow influencing portion (swirler and rib described later) for influencing air flow is normally provided inside a tip end side part of the pulverized coal supply pipe for improving ignition/flame stability of the pulverized coal burner. By providing the air flow influencing portion inside the tip end of the pulverized coal supply pipe in this manner, the pulverized coal can be dispersed and supplied into the combustion furnace and also a relatively large reverse-flow region can be generated in the combustion furnace.

As a conventional example of the air flow influencing portion in the pulverized coal burner, in Patent document 1 for example, a turn degree adjustment blade (rib) 42 is provided inside a tip end of a pulverized coal supply pipe 41 of a pulverized coal burner 40, as illustrated in FIG. 13. Additionally, in this example, a turning blade 43 is provided in the midway of a flow passage of the pulverized coal supply pipe 41.

In the conventional example illustrated in FIG. 13, firstly a turning component applied to the pulverized coal/transport air 44 flowing into the pulverized coal supply pipe 41 by the turning blade 43. The pulverized coal/transport air 44 to which the turning component has been applied is decreased in turn degree by the turn degree adjustment blade (rib) 42 provided inside the tip end of the pulverized coal supply pipe 41, and charged into a combustion furnace 45 after being adjusted in turn degree.

If flow velocity of the pulverized coal/transport air 44 supplied from the pulverized coal supply pipe 41 into the combustion furnace 45 is too fast, the pulverized coal becomes hard to combust in the combustion furnace 45. In this regard, since the turn degree of the pulverized coal/transport air 44 charged into the combustion furnace 45 is adjusted by the turn degree adjustment blade 42 in the conventional example illustrated in FIG. 13, the velocity of the pulverized coal/transport air 44 is decreased and the ignition/flame stability of the pulverized coal can be improved.

Additionally, as another conventional example, Patent document 2 also describes a configuration in which a swirler for turning pulverized coal (turning blade) is provided inside a tip end of a primary throat for transporting the pulverized coal using a transport air.

By the way, although the pulverized coal and petroleum are typical examples of fuel for the combustion furnace such as a boiler as mentioned above, petroleum pitch (petroleum residue) is often used as fuel instead. Of the petroleum pitch, heavy one is a solid fuel as the pulverized coal, and even when the solid petroleum pitch is used as fuel, the basic structure of the boiler is not significantly different from that of the coal burning boiler.

CITATION LIST

Patent Document

[Patent Document 1] Japanese Patent Application Laid-Open No. H9-26112
[Patent Document 2] Japanese Patent Application Laid-Open No. H5-272711

SUMMARY OF INVENTION

Objects to be Achieved by the Invention

However, some of the petroleum pitch fuel is relatively low in temperature of its softening point (150~350° C.), and when such petroleum pitch fuel whose softening point is low is used in a conventional coal burning boiler, problems as stated below will be caused by its special characteristic.

Even when the petroleum pitch fuel is used as fuel for a boiler, the petroleum pitch fuel is charged into the combustion furnace via the fuel supply pipe by the compressed air similarly to the case of the pulverized coal burning boiler. Then, the petroleum pitch fuel flowing toward a end exit of the fuel supply pipe is increased in temperature receiving radiation heat from the combustion furnace as approaching the tip end exit, namely approaching the combustion furnace.

Here, in the case of the petroleum pitch fuel whose softening point is low, it becomes soften and pasted as the temperature is increased, and it easily adheres to surrounding structures. Particularly, when there are structures for adjusting flow of the petroleum pitch and transport air, such as for example the swirler (turning blade), the rib (turn degree adjustment blade) and the like in the conventional technique, inside the fuel supply pipe the pasted petroleum pitch fuel tends to adhere to the surface of the structures when colliding with the same.

If the petroleum pitch adheres to and is solidified at the inside of the fuel supply pipe or the like with lapse of boiler operation time and its deposits become thicker, an appropriate air flow cannot be formed inside the burner and it becomes unusable.

When the petroleum pitch is deposited and the burner becomes unusable, the boiler cannot be operated. Therefore, when the burner becomes unusable due to the deposited petroleum pitch fuel, it is needed to temporarily stop the boiler and replace the burner.

The present invention is made considering the above-stated problems of the conventional techniques, and its object is to provide a combustion system that, even when the petroleum pitch is used as fuel, the burner does not become unusable due to adherence/solidification of the petroleum pitch inside the burner and combustion operation can continue for a long time.

Means for Achieving Objects

In order to achieve the above-stated objects, a first aspect of the present invention is a combustion system in which a petroleum pitch fuel can be used, comprising: a burner having a fuel supply pipe where a flame stabilizing plate is formed in a tip end of the same; and a high temperature maintaining unit configured to maintain an atmosphere temperature at a vicinity of the flame stabilizing plate during an operation higher than a softening point of the petroleum pitch fuel.

A second aspect of the present invention is that, in the first aspect, the high temperature maintaining unit maintains an atmosphere temperature at a vicinity of the flame stabilizing plate during an operation at 400° C. or higher.

A third aspect of the present invention is that, in the first or second aspect, the high temperature maintaining unit has a fire resistant material surrounding a combustion region where the burner is placed.

A fourth aspect of the present invention is that, in any one of the first to third aspects, the high temperature maintaining unit is configured by arranging the one burner and the other burner so that a flame of the one burner heats a vicinity of the flame stabilizing plate of the other burner.

A fifth aspect of the present invention is that, in the first to fourth aspects, the fuel supply pipe has a cylindrical main body portion where the flame stabilizing plate is formed at a front end of the same, and also the burner has a cooling unit configured to maintain a temperature of an inner peripheral surface of the cylindrical main body portion lower than the softening point of the petroleum pitch fuel.

A sixth aspect of the present invention is that, in the fifth aspect, the cooling unit maintains a temperature of an inner peripheral surface of the cylindrical main body portion of the fuel supply pipe at 100° C. or lower.

A seventh aspect of the present invention is that, in the fifth or sixth aspect, the cooling unit has a cooling material flow passage formed annually around an outer wall surface of the fuel supply pipe.

An eighth aspect of the present invention is that, in the seventh aspect, the cooling material flow passage extends up to a midway of the flame stabilizing plate, exceeding a front end of the cylindrical main body portion of the fuel supply pipe.

A ninth aspect of the present invention is that, in any one of the first to eighth aspects, the flame stabilizing plate is formed so as to expand outward in a radial direction toward a tip end side of the burner.

A tenth aspect of the present invention is that, in the ninth aspect, an annular step portion for influencing a flow of a gas which transports a fuel so as to improve a combustion efficiency is formed on an inner peripheral surface of the flame stabilizing plate.

An eleventh aspect of the present invention is that, in any one of the first to tenth aspects, the burner is arranged in a high-temperature reducing combustion zone of an inverted low NOx boiler.

A twelfth aspect of the present invention is that, in any one of the first to eleventh aspects, the burner has a fuel concentration adjusting unit which is provided on an upstream side of the fuel supply pipe so as to intensively concentrate a fuel on an inner peripheral wall side of the fuel supply pipe and also make a concentration distribution of the fuel uniform in a peripheral direction of the fuel supply pipe.

A thirteenth aspect of the present invention is that, in any one of the first to twelfth aspects, an open space having no obstacle disturbing a flow of a gas which transports a fuel is formed inside a tip end side part of the fuel supply pipe excluding the flame stabilizing plate.

A fourteenth aspect of the present invention is that, in any one of the first to thirteenth aspects, at least a part of an inner wall surface of the fuel supply pipe is electropolished.

Effect of the Invention

The present invention can provide a combustion system that, even when the petroleum pitch is used as fuel, the burner does not becomes unusable due to adhesion/solidification of the petroleum pitch inside the burner and the boiler operation can be continued for a long time.

EMBODIMENT OF THE INVENTION

Figure 1:
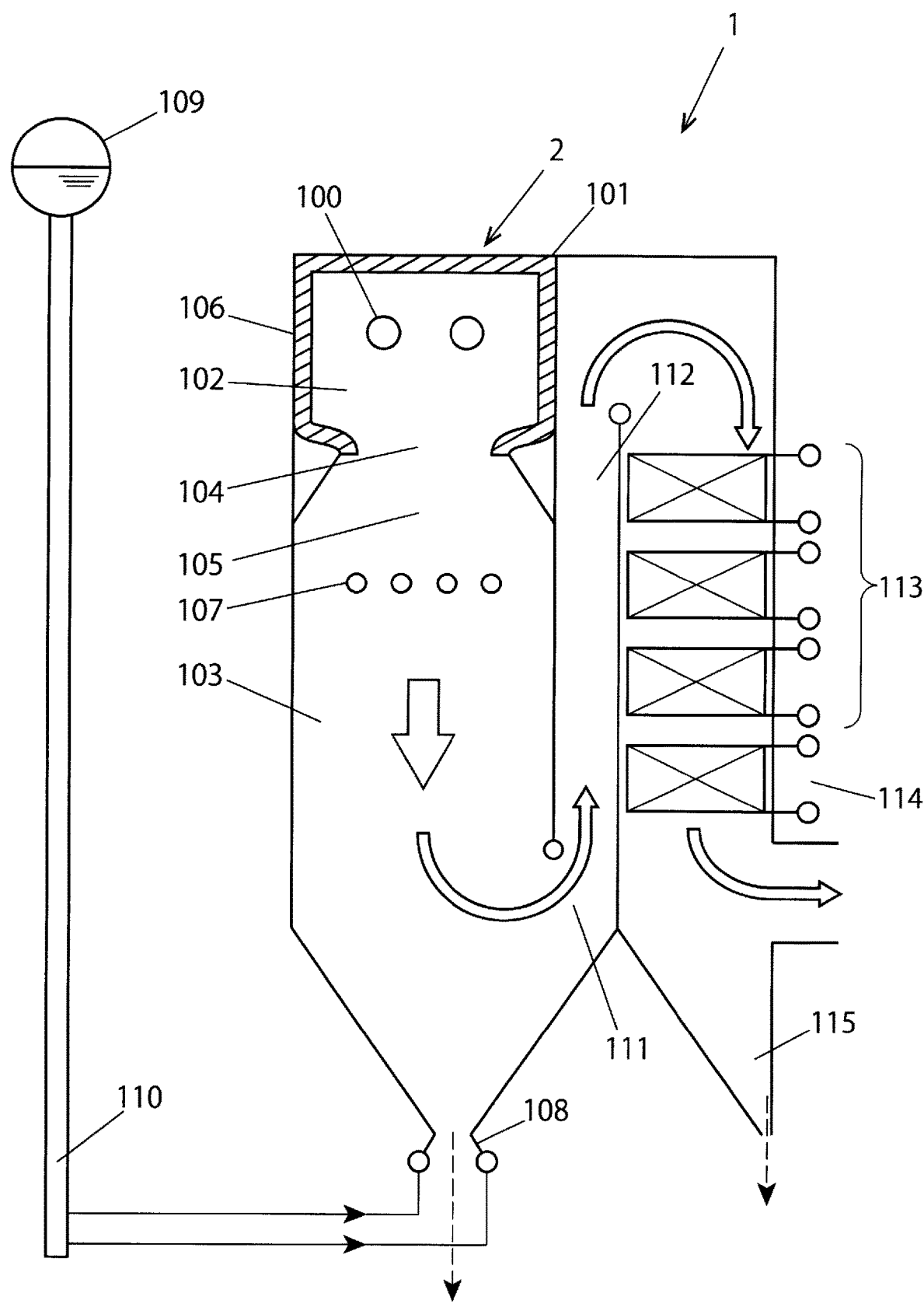
FIG. 1 is a longitudinal section view illustrating a schematic configuration of a combustion system according to one embodiment of the present invention.

Hereunder, a combustion system according to one embodiment of the present invention will be described referring to the drawings.

A burner used in the combustion system according to this embodiment is a burner used in a combustion furnace whose fuel is a petroleum pitch (petroleum residue), and in particular, a burner used in a combustion furnace whose fuel is a petroleum pitch having a low softening point.

EUREKA pitch ("EUREKA" is a registered trademark) is one of the low softening point petroleum pitches. The softening point of the EUREKA pitch is in a range of 180~200° C., for example, and its solid state is softened when the temperature gets within this temperature range or higher.

Since the EUREKA pitch has a special property different from the pulverized coal as mentioned above, inventers of the present invention conducted experiment and research in order to elucidate mechanisms of softening and adherence of the EUREKA pitch.

First, as a mechanism that the EUREKA pitch is softened and adheres, any one of the mechanisms below or combination (superimposition) of them can be conceived.

(1) The EUREKA pitch is heated (increased in temperature) by radiant heat from combustion gas in a furnace and softened, in a transport/injection process in a burner toward the furnace.

(2) The EUREKA pitch comes into contact with a structure (nozzle tip end portion, swirler, or the like) in an injection portion (port) heated by the combustion gas in the furnace, thereby being heated (increased in temperature) and softened.

(3) The EUREKA pitch is softened through the synergetic effect of the said (1) and (2), and the softened EUREKA pitch adheres to a structure with it comes into contact.

Next, of the above-stated mechanisms (1)~(3), which one is dominant in softening/adherence of the EUREKA pitch will be considered.

First, considering the case when a structure such as a turn degree adjustment blade or the like is provided near the nozzle tip end portion (refer to Patent document 1), increase in temperature of the EUREKA pitch is less at a nozzle upstream side since the nozzle obstructs the radiant heat, and therefore mainly (2) is considered to be dominant as a softening mechanism.

Hereunder, we consider based on the result of an adherence basic experiment (cold & hot) executed by the inventors of the present invention.

Figure 10:
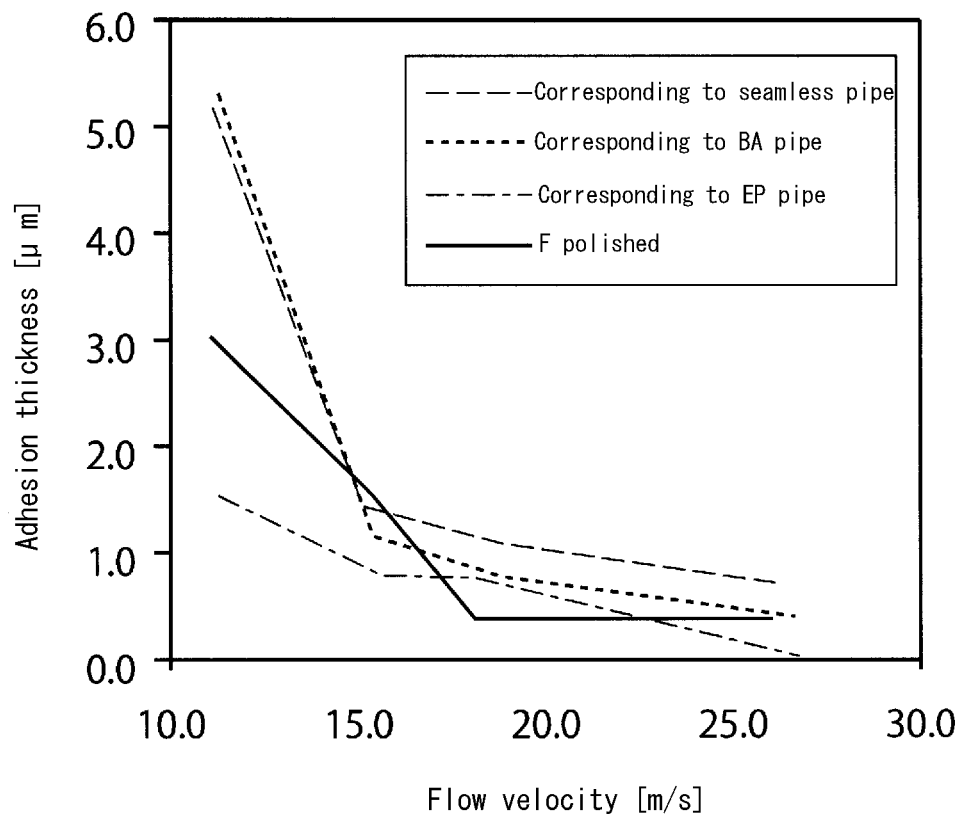
FIG. 10 is a graph illustrating the result of a cold experiment for properties of EUREKA pitch.

1) Influence of Surface Roughness (FIG. 10 Influence of Gravity is Ignored and Only Influence of Flow Velocity is Considered.)

Generally, the more surface roughness, the more adhesion amount. However, according to the result (FIG. 10), the surface roughness has less influence on the adhesion amount at the flow velocity of an actual equipment (about 19 m/s) and the flow velocity in a combustion experiment. It is because the EUREKA pitch easily peels off even if it adheres in the case of high velocity flow (cold experiment), while the once-adhered EUREKA pitch continues to adhere in the case of low velocity flow.

Figure 11:
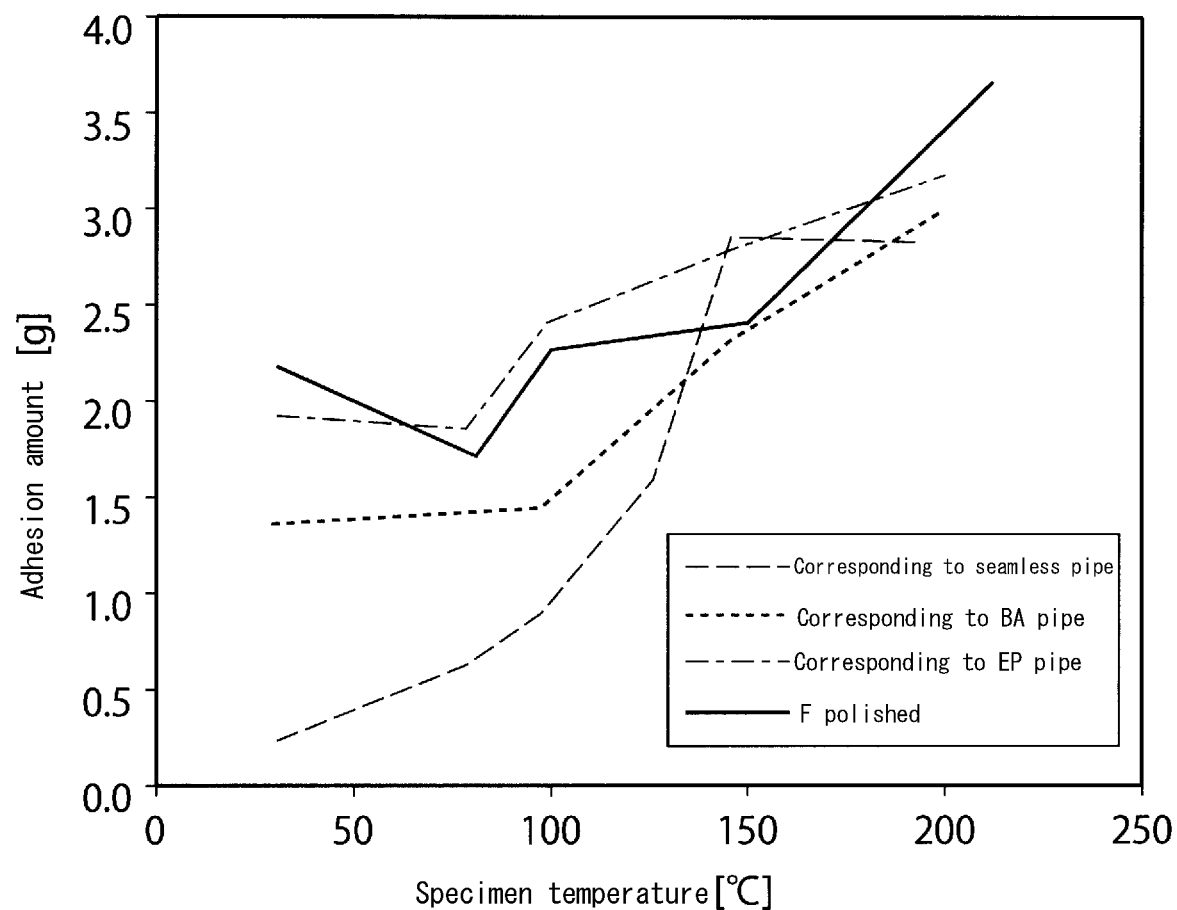
FIG. 11 is a graph illustrating a first result of a hot experiment for properties of EUREKA pitch.
Figure 12:
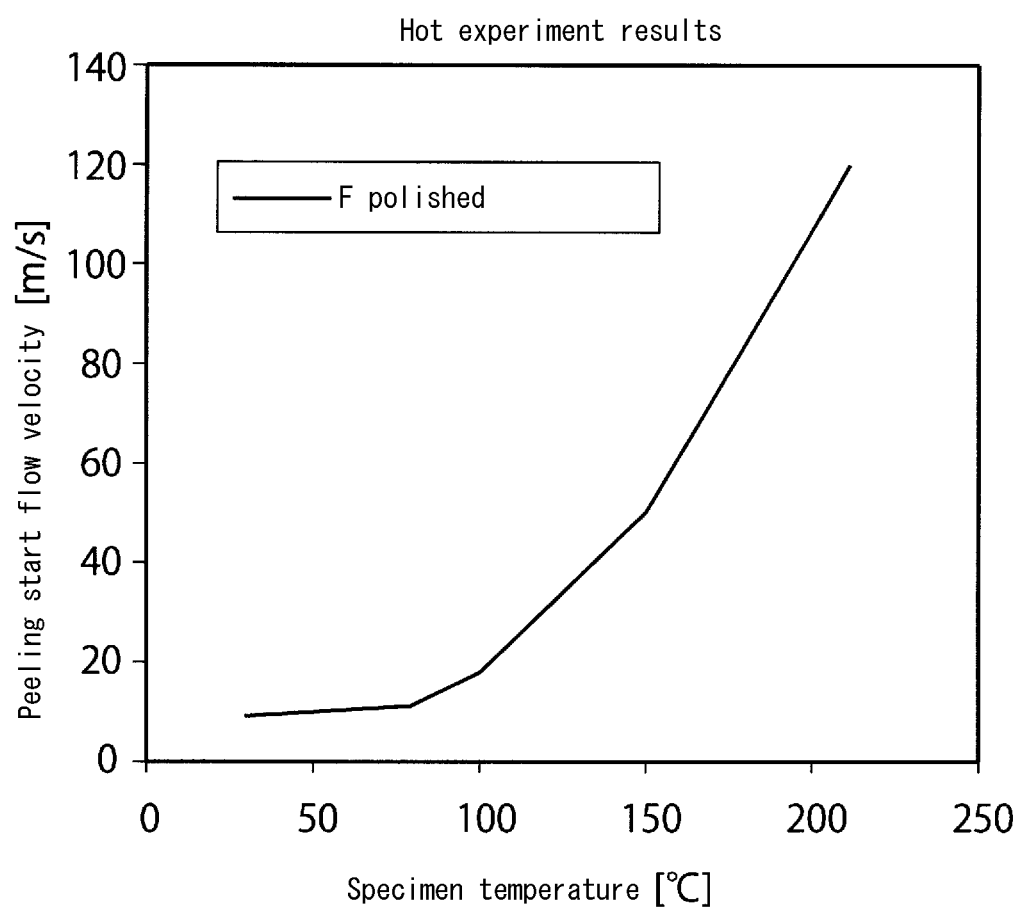
FIG. 12 is a graph illustrating a second result of the hot experiment for properties of EUREKA pitch.
Figure 13:
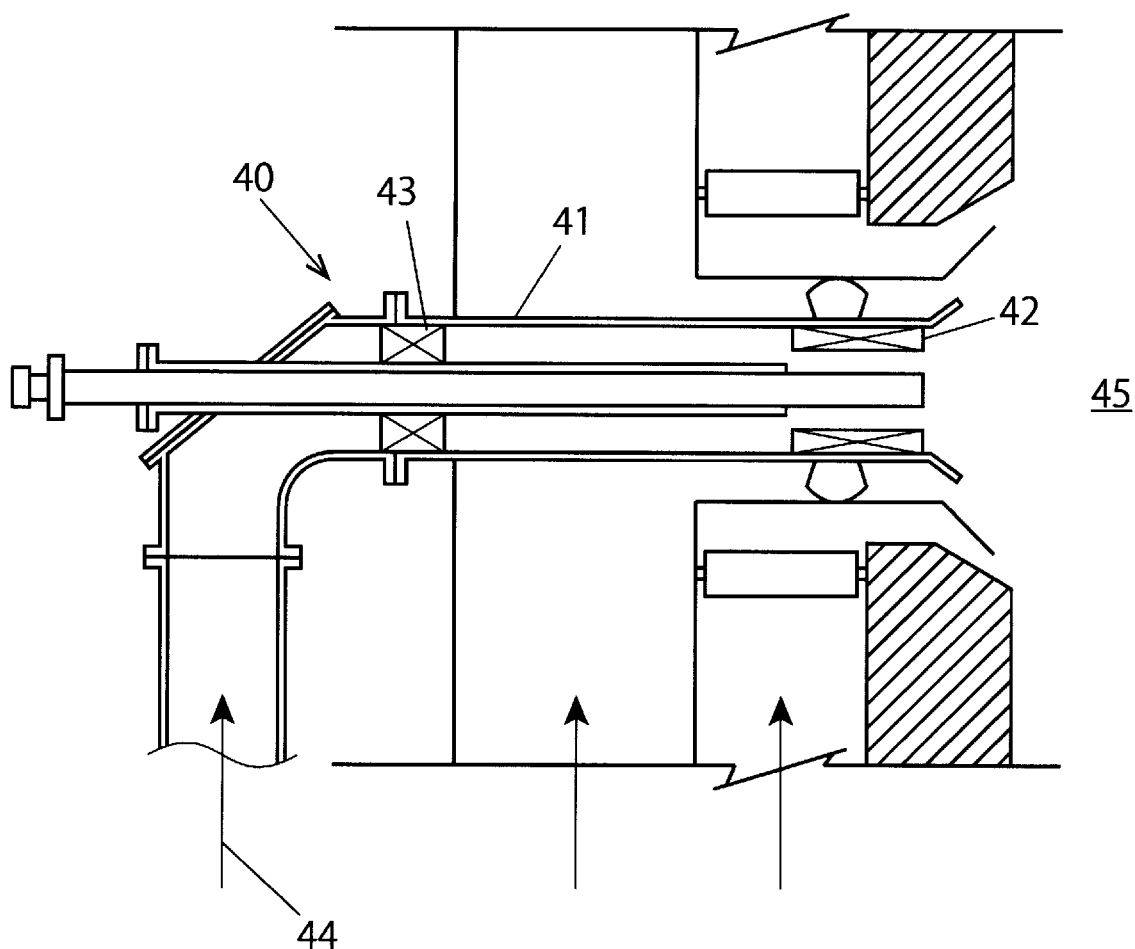
FIG. 13 is a longitudinal section view illustrating a conventional burner for pulverized coal burning boiler.

2) Influence of Structure Temperature (FIG. 11, FIG. 12)

As the temperature is increased, the adhesion amount is increased (adheres to the whole surface at 150° C. or higher) regardless of degree of surface roughness. In contrast, the EUREKA pitch easily peels off at 100° C. or lower even when flow velocity is 20 m/s or lower (FIG. 12), and the adhesion amount is decreased.

Specific description is as below.

When the powdered EURIKA pitch is shifted in a state that a plate temperature exceeds 150° C., the powder adhered to the whole plate surface. Additionally, the adhered powder hardly peels off even when the air of 100 m/s in flow velocity is blown.

While, when the plate temperature is 100° C. or lower, most of the powder peeled off only by blowing the air of about 20 m/s. Thus, it can be determined that temperature of the structure is a significantly big factor.

3) Conclusion

Putting the result of the adherence basic experiment together, the said (2) is considered to be dominant in the mechanisms of softening and adherence of the EUREKA pitch. Therefore, it is important to suppress increase in temperature inside the burner until the EUREKA pitch is charged into the furnace in order to prevent softening and adherence to the burner.

While, it is difficult to sufficiently cool a tip end portion of the burner, since the tip end portion of the burner strongly receives radiant heat from the flame. Particularly, since a flame stabilizing plate provided to the tip end portion of the burner is formed in a trumpet shape which expands into a flared shape, it receives radiant heat from the flame more easily compared to a straight cylindrical part.

Accordingly, as for the flame stabilizing plate part of the burner, it is considered that the EUREKA pitch adhering to the flame stabilizing plate is rather heated utilizing the radiant heat from the flame so as to make its temperature higher than the softening point, thereby lowering viscosity of the EUREKA pitch and removing the same.

The present invention is made based on the above-mentioned newly obtained knowledge and comprises characteristics described below.

Figure 2:
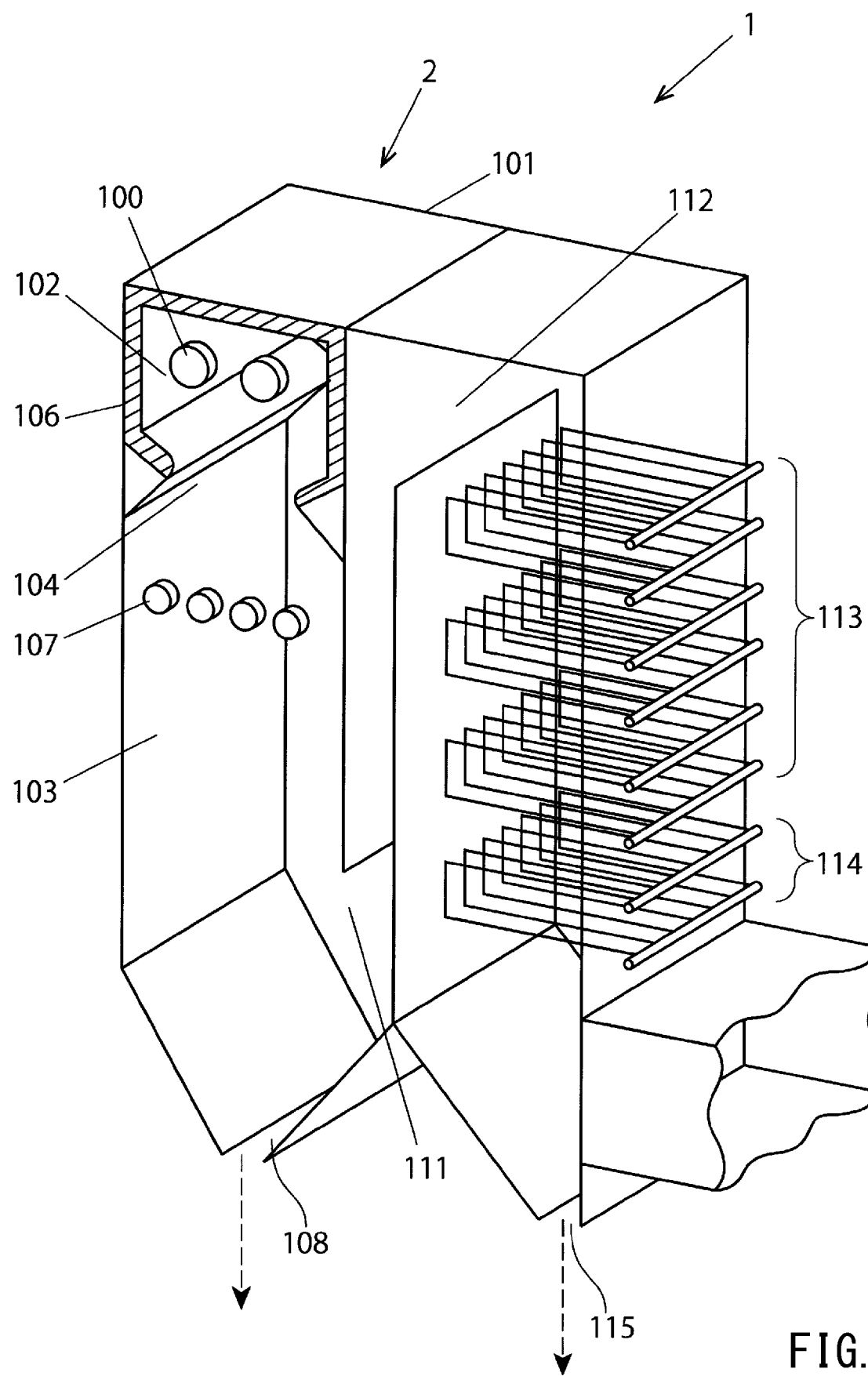
FIG. 2 is a perspective view illustrating the schematic configuration of the combustion system in FIG. 1.

As illustrated in FIG. 1 and FIG. 2, a combustion system 1 according to this embodiment comprises an inverted low NOx boiler 2. The inverted low NOx boiler 2 is a thermal power boiler which burns fuel thereinside and recoveries heat energy from the combustion gas. As fuel, liquid, gaseous, and pulverized carbon fuel can be used and also pulverized petroleum pitch (petroleum residue) can be used. In the combustion system 1 according to this embodiment, the petroleum pitch is used as fuel.

In the inverted low NOx boiler 2, a high-temperature reducing combustion zone 102 is formed in an upper end portion of a vertical combustion chamber 101, and a low-temperature oxidation combustion zone 103 is formed in a middle stage portion. The high-temperature reducing combustion zone 102 and the low-temperature oxidation combustion zone 103 are separated by a gas cooling zone 105 from a narrowing portion 104 to a secondary combustion air nozzle 107, thereby achieving an appropriate secondary combustion (low oxidation combustion) temperature for achieving low NOx. In the high-temperature reducing combustion zone 102, a burner 100 is provided on a side wall, and the side wall and a top wall are covered with a fire resistant material 106 which copes with a furnace temperature of 1500° C. or higher.

In the narrowing portion 104, a projection in a flange shape is protruded over the entire circumference of the inner surface of the combustion chamber 101, and a gas-passing cross section area is narrowed by 20-50% compared to the combustion chamber 101. Additionally, a side of the narrowing portion 104 facing the high-temperature reducing combustion zone 102 is covered with the fire resistant material similarly to the high-temperature reducing combustion zone 102. The burners 100 are provided in parallel in a horizontal direction on opposing two side surfaces in the high-temperature reducing combustion zone 102 of the combustion chamber 101, and arranged in axially parallel and with an interval so that a flame axis does not confront.

Below the narrowing portion 104, the secondary combustion air nozzle 107 is opened and the low-temperature oxidation combustion zone 103 is formed. Below the low-temperature oxidation combustion zone 103, the combustion chamber wall is constricted into a tapered shape of about 35° C. relative to a vertical line, and an ash discharge port 108 is provided at a taper bottom portion. An optimal value of a taper angle differs depending on a critical contact angel between deposited material and the wall, and when handling a fragile object, a taper angle of about 45° C. is also available.

The low-temperature oxidation combustion zone 103 is a water-cooled wall structure in which a cooling pipe illustrated as a border in the figure is arranged on the side wall, and the structure is water-cooled. The cooling pipe is connected to an unheated water falling pipe 110 at the bottom portion of the combustion chamber 101, and configured so that sufficiently high pressure cooled water can be surely supplied to the high-temperature reducing combustion zone 102 via the unheated water falling pipe 110 by a steam drum 109 provided in a higher position than the combustion chamber 101.

A gas outflow port 111 is provided to a lower side surface of the low-temperature oxidation combustion zone 103 and opens into a gas conduction passage 112. The gas conduction passage 112 transports combustion gas to a post-treatment process after passing through a steam superheating pipe 113, an economizer 114. An ash discharge port 115 is provided at the bottom portion of the steam superheating pipe 113, the economizer 114.

The inverted low NOx boiler is configured such that fuel is supplied to the upper end portion of the combustion chamber 101 and burned in a reducing atmosphere, and then the combustion proceeds from the upper end portion downwardly and the combustion is finished in an oxidizing atmosphere, and the combustion gas is extracted from the lower portion.

For performing the combustion operation in the inverted low NOx boiler 2, first, fuel and air are introduced to the burner 100 in the high-temperature reducing zone 102 and combustion is started. In the high-temperature reducing combustion zone 102, introduction of air is suppressed, and an air ratio is maintained at 1 or less, for example about 0.6-0.8 of reducing atmosphere, and fuel is burned at high temperature of about 1500° C. which is selected according to fuel.

In the high-temperature reducing combustion zone 102, combustion gas convents in a horizontal direction so as to form spirals due to the flame from the burners 100 which are arranged so as to be horizontally displaced from the axis. Further, in combination with the fact that the combustion gas is low in concentration since the temperature of the high-temperature reducing combustion zone 102 is high, the combustion gas stays in the high-temperature reducing combustion zone 102 for a long time and is kept warm by the fire resistant material 106 so that the combustion goes around stably.

The combustion gas sufficiently heated through the combustion in the high-temperature reducing combustion zone 102 is pushed out from the high-temperature reducing combustion zone 102 since the combustion gas is increased due to newly charged fuel, and flows into the low-temperature oxidation combustion zone 103 through the narrowing portion 104. In the low-temperature oxidation combustion zone 103, the secondary combustion air which is relatively low in temperature is sufficiently supplied from the secondary combustion air nozzle 107, and the unburned combustion gas is completely burned with the oxidation atmosphere.

After finishing combustion, the combustion gas descends in the combustion chamber and flows out to the gas conduction passage 112 from the gas outflow port 111. In the gas conduction passage 112, boiler water supply and heat exchange are performed in the steam superheating pipe 113, the economizer 114, and the combustion gas flows out to the post-treatment process.

As stated above, in the inverted low NOx boiler 2 according to this embodiment, fuel undergoes the first combustion with the high-temperature reducing atmosphere in the high-temperature reducing combustion zone 102, and further undergoes the secondary combustion with the low-temperature oxidation atmosphere in the low-temperature oxidation combustion zone 103.

Note that, in the inverted low NOx boiler 2 according to this embodiment, the temperature of the high-temperature reducing combustion zone 102 is higher than that of a conventional boiler. Accordingly, in order to improve cooling performance, the steam drum 109 is provided in a higher position than the upper end of the combustion chamber 101 and the unheated water falling pipe 110 is made longer than the height of the combustion chamber 101, thereby increasing the pressure of the cooling water in the unheated water falling pipe 110 so as to promote circulation of the cooling water.

Figure 3:
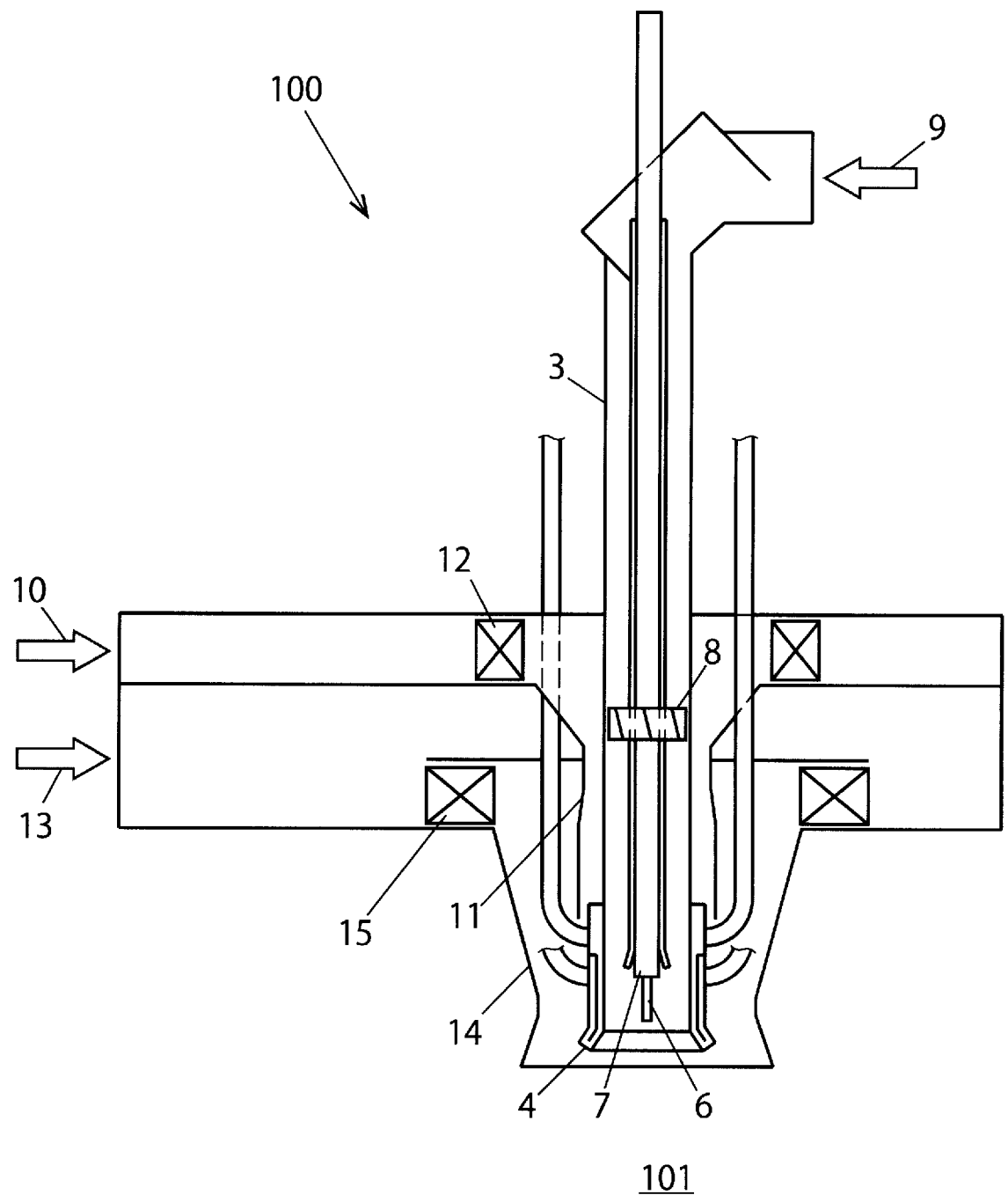
FIG. 3 is a longitudinal section view of a burner for petroleum pitch fuel in the combustion system in FIG. 1 and FIG. 2.
Figure 4:
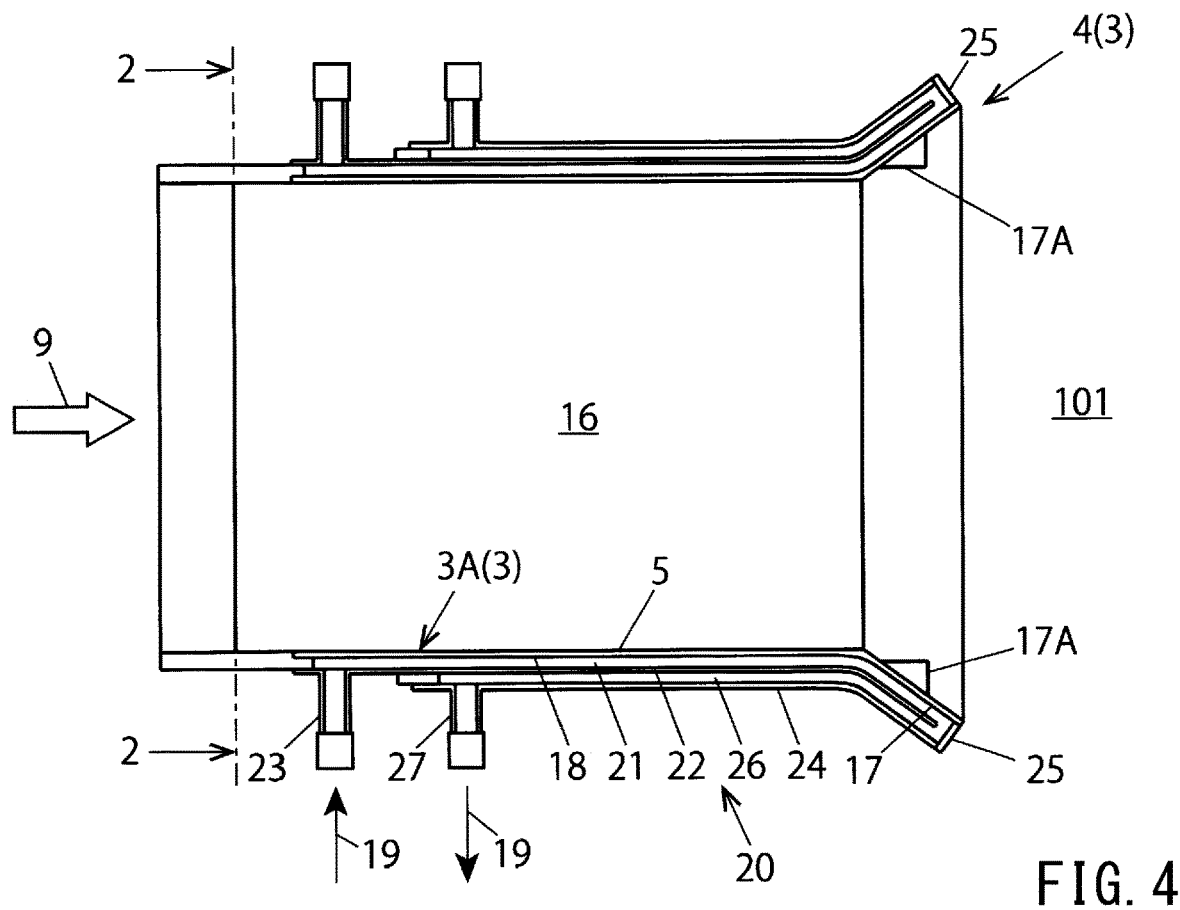
FIG. 4 is a longitudinal section view enlarging and illustrating a tip end side part of a fuel supply pipe of the burner for petroleum pitch fuel in FIG. 3.
Figure 5:
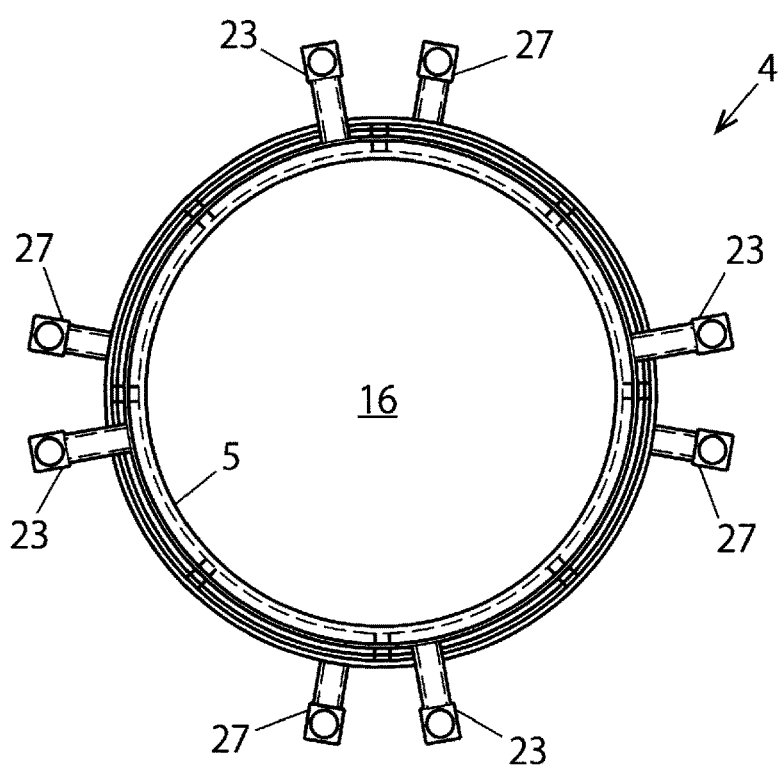
FIG. 5 is a figure viewed from the arrow direction of the 2-2 line in FIG. 4.

As illustrated in FIG. 3 to FIG. 5, the burner 100 for petroleum pitch fuel in the combustion system 1 according to this embodiment has a fuel supply pipe (burner throat) 3 for supplying the petroleum pitch together with the transport gas to the combustion furnace 101. The above-mentioned high-temperature reducing combustion zone 102 is formed in the combustion furnace 101.

Typically, air is used as the transport gas. When using air, the transport gas is utilized for transporting the petroleum pitch and also contributes to combustion. The transport gas is introduced inside the fuel supply pipe 3 preferably at room temperature.

In this embodiment, at least part of an inner wall surface 5 of the fuel supply pipe 3 is electropolished, thereby increasing its smoothness. As a result, the petroleum pitch hardly adheres to the inner wall surface 5 of the fuel supply pipe 3.

A secondary fuel injection pipe 6 is provided at the center of the inside of the fuel supply pipe 3 along a pipe axis direction. The secondary fuel injection pipe 6 is inserted inside an injection pipe inserting pipe 7, and capable of moving back and forward along the injection pipe inserting pipe 7.

A turning blade (swirler) 8 as a fuel concentration adjusting unit is provided at the center portion of the pipe axis direction of the fuel supply pipe 3, and a turning component is applied to the petroleum pitch/transport gas 9 by this turning blade 8.

A secondary air supply mechanism 11 for supplying a secondary air 10 to the combustion furnace 101 is provided to the center of an outer peripheral portion of the fuel supply pipe 3. The secondary air supply mechanism 11 has a turning blade (swirler) 12 for applying a turning component to the secondary air 10.

The fuel concentration adjusting unit configured by the turning blade 8 has a function of intensively concentrating fuel on the inner peripheral wall side of the fuel supply pipe 3 and also making the concentration distribution of fuel uniform in the peripheral direction of the fuel supply pipe 3.

A third air supply mechanism 14 for supplying a third air 13 to the combustion furnace 101 is provided to a tip end of the outer peripheral portion of the fuel supply pipe 3. The third air supply mechanism 14 has a turning vane 15 for applying a turning component to the third air 13.

As illustrated in FIG. 4 and FIG. 5, in the burner 100 for petroleum pitch fuel, an open space 16 having no obstacle disturbing the flow of the petroleum pitch/transport gas 9 is formed inside the tip end side part (excluding a flame stabilizing plate 17 described later) of the fuel supply pipe 3.

Namely, the burner 100 for petroleum pitch fuel according to this embodiment does not comprise the air flow influencing portion (swirler and rib) which is provided to a tip end side part of the fuel supply pipe of a conventional pulverized coal burning burner, and therefore the flow of the petroleum pitch/transport gas 9 is not disturbed at the tip end side part (excluding the flame stabilizing plate 17) of the fuel supply pipe 3.

Note that, in the case of the low softening point petroleum pitch whose fuel rate is about 2.5 or less, appropriate combustion can be secured in the combustion furnace even after removing the rib (turn degree adjustment blade) and the like from the tip end side part of the fuel supply pipe.

As illustrated in FIG. 4, the fuel supply pipe 3 of the burner 100 for petroleum pitch fuel according to this embodiment has a cylindrical main body portion 3A and the flame stabilizing plate 17 formed by expanding a front end of the cylindrical main body portion 3A outward in a radial direction into a flared shape. The trumpet-shaped flame stabilizing plate 17 is effective for stabilizing the flame formed by the burner 100, inside the combustion furnace 101.

An annular step portion 17A having a triangular cross section is formed on an inner peripheral surface of the flame stabilizing plate 17. The annular step portion 17A improves combustion efficiency of the petroleum pitch fuel by influencing the air flow of the petroleum pitch/transport gas 9 discharged from a tip end opening of the fuel supply pipe 3 and forming a vortex of combustion. Additionally, by the change in air flow due to the existence of the annular step portion 17A, the flame formed on the front side of the burner 100 approaches the flame stabilizing plate 17.

The atmosphere temperature of the vicinity of the flame stabilizing plate 17 is increased by the improvement of the combustion efficiency of the petroleum pitch fuel thanks to the annular step portion 17A and the approach of the flame toward the flame stabilizing plate 17.

The burner 100 for petroleum pitch fuel in the combustion system 1 according to this embodiment comprises a cooling unit 20 for cooling an inner wall surface 5 of the tip end side part of the fuel supply pipe 3 by bringing a cooling material 19 into contact with an outer wall surface 18 of the tip end side part of the fuel supply pipe 3. As the cooling material 19, preferably liquid is used, and more preferably water is used.

The cooling unit 20 has a cooling material flow passage 21 which is annually formed around the outer wall surface 18 of the fuel supply pipe 3. The cooling material flow passage 21 is formed by an inner side tubular member 22 arranged on the outer periphery of the tip end side part of the fuel supply pipe 3. A cooling material introduction port 23 is formed on an inlet side of the cooling material flow passage 21.

An outer side tubular member 24 is arranged around the outer peripheral surface of the inner side tubular member 22, and a gap between the outer surface of the flame stabilizing plate 17 of the fuel supply pipe 3 and a tip end of the outer side tubular member 24 is sealed by an annular sealing member 25.

A recirculation flow passage 26 for cooling material is formed by the outer peripheral surface of the inner side tubular member 22 and the inner peripheral surface of the outer side tubular member 24. A cooling material discharge port 27 is formed on an outlet side of the recirculation flow passage 26. As illustrated in FIG. 5, the cooling material introduction port 23 and the cooling material discharge port 27 are arranged in fours respectively at intervals of 90° C. in the circumferential direction.

In this embodiment, the cooling material flow passage 21 extends up to a midway of the flame stabilizing plate 17, exceeding the front end of the cylindrical main body portion 3A of the fuel supply pipe 3. Specifically, the cooling material flow passage 21 extends up to a midway position of the annular step portion 17A formed on the inner peripheral surface of the flame stabilizing plate 17. As above, by forming the cooling material flow passage 21 up to a midway of the flame stabilizing plate 17 exceeding the front end of the cylindrical main body portion 3A of the fuel supply pipe 3, the cylindrical main body portion 3A of the fuel supply pipe 3 can be surely cooled up to its front end.

Particularly, in the combustion system 1 according to this embodiment, the inverted low NOx boiler 2 is used as a boiler, and therefore the high-temperature reducing combustion zone 102 where the burner 100 is arranged is higher in temperature than a combustion chamber of a conventional boiler. Thereby, the atmosphere temperature of the vicinity of the flame stabilizing plate 17 of the burner 100 is maintained sufficiently high. Specifically, the atmosphere temperature of the vicinity of the flame stabilizing plate 17 is maintained higher than the softening point of the petroleum pitch.

For example, the furnace temperature is decreased upon a low-load operation, while the inverted low NOx boiler 2 can maintain the temperature of the high-temperature reducing zone 102 where the burner 100 is arranged sufficiently high even upon the low-load operation. Accordingly, even when the petroleum pitch adheres to the inner peripheral surface of the flame stabilizing plate 17, it is decreased in viscosity and removed since the surrounding atmosphere temperature is sufficiently high, and therefore adhered substances never grow on the inner peripheral surface of the flame stabilizing plate 17.

In this embodiment, the inverted low NOx boiler 2 configures a temperature maintaining unit in the present invention. Namely, the inverted low NOx boiler 2 functions as a unit for maintaining the atmosphere temperature of the vicinity of the flame stabilizing plate 17 of the burner 100 in operation higher than the softening point of the petroleum pitch fuel.

Specifically, the temperature of the high-temperature reducing combustion zone 102 is maintained high by the existence of the fire resistant material 106. Additionally, that a plurality of burners 100 are arranged zigzag so as to be opposed to each other also contributes to increase in temperature of the high-temperature reducing combustion zone 102. That the burners 100 arranged so as to be opposed to each other heat the vicinity of their flame stabilizing plates 17 also contributes to increase in atmosphere temperature of the vicinity of the flame stabilizing plate 17.

The inverted low NOx boiler 2 as a temperature maintaining unit in this embodiment preferably maintains the atmosphere temperature of the vicinity of the flame stabilizing plate 17 of the burner 100 400° C. or higher.

In contrast, in the cylindrical main body portion 3A of the petroleum pitch combustion burner 100, heat is continuously removed from the outer wall surface 18 of the fuel supply pipe 3, by supplying the cooling material 19 into the cooling material flow passage 21 via the cooling material introduction port 23 while discharging the cooling material 19 via the recirculation flow passage 26 and the cooling material discharge port 27. Thereby, the pipe wall of the cylindrical main body portion 3A of the fuel supply pipe 3 is cooled and its inner wall surface 5 is also maintained at a predetermined temperature or lower.

Here, the above-mentioned predetermined temperature of the inner wall surface 5 of the cylindrical main body portion 3A of the fuel supply pipe 3 is a temperature at which the temperature of the petroleum pitch in the vicinity of the inner wall surface 5 of the fuel supply pipe 3 becomes the softening point or lower. Preferably, the temperature of the inner wall surface 5 of the fuel supply pipe 3 is maintained at 100° C. or lower by a cooling using the cooling unit 20.

Additionally, in order to prevent the petroleum pitch from adhering to the tip end side part of the fuel supply pipe 3 or in order to shorten contact time (even when it does not adhere), the flow velocity in the fuel supply pipe 3 is maintained at 15 m/s or higher, based on the knowledge obtained in the experiment.

As stated above, in the burner 100 for petroleum pitch fuel in the combustion system 1 according to this embodiment, by maintaining the temperature of the inner wall surface 5 of the cylindrical main body portion 3A of the fuel supply pipe 3 at a predetermined temperature or lower, the petroleum pitch can be prevented from reaching its softening point and becoming pasted. Thereby, the pasted petroleum pitch can be prevented from adhering and depositing on the inner wall surface 5 of the cylindrical main body portion 3A of the fuel supply pipe 3 so as to avoid a situation that the burner 100 becomes unusable.

Additionally, in the burner 100 for petroleum pitch fuel according to this embodiment, there in formed the open space 16 having no obstacle disturbing the flow of the petroleum pitch/transport gas 9 inside the tip end side part (excluding the flame stabilizing plate 17) of the fuel supply pipe 3, focusing on that fact that the turn degree adjustment mechanism in the burner tip end portion is not necessarily essential for combustion in the case of the low softening point petroleum pitch whose fuel rate is about 2.5 or less. Thereby, the petroleum pitch transported by the transport gas hardly adheres to the inside of the fuel supply pipe 3, in combination with the above-mentioned cooling effect.

Additionally, in the burner 100 for petroleum pitch fuel according to this embodiment, the inner wall surface 5 of the fuel supply pipe 3 is electropolished, and therefore the petroleum pitch more hardly adheres. The electropolish may be performed including the flame stabilizing plate 17 and the annular step portion 17A.

Additionally, by making the flow velocity in the fuel supply pipe 3 15 m/s or higher, the petroleum pitch can be more surely prevented from adhering to the tip end side part of the fuel supply pipe 3.

Note that, the concentration adjusting unit (turning blade 8) can, by a simple configuration, make the concentration distribution in the peripheral direction uniform by correcting the bias of fuel concentration in the peripheral direction occurred at a piping bend portion or the like on the upstream side of the fuel supply pipe 3, and also it can form a distribution that an air/fuel rate in the fuel supply pipe becomes high on the center side and low on the peripheral wall side.

This concentration adjusting unit is in the upstream portion of the fuel supply pipe 3 and exists in a position where it hardly receives radiant heat of the flame of the boiler, and therefore its temperature is maintained relatively low and the petroleum pitch never reaches the softening temperature even when the petroleum pitch whose softening point is low comes into contact with the same.

In contrast, the turn degree adjustment mechanism is in an air flow passing part in the inner peripheral portion of the fuel supply pipe 3, therefore it is a structure with which fuel most tends to collide or come into contact. Nevertheless, since it is in the tip end portion of the supply pipe, its temperature is high and when the low softening point petroleum pitch comes into contact with the same, the temperature of the petroleum pitch immediately reaches the softening temperature or higher and the petroleum pitch adheres.

While, the low softening point petroleum pitch whose fuel rate is about 2.5 or less can ensure an appropriate concentration by the concentration adjusting mechanism, and therefore an appropriate combustion can be ensured in the boiler even when the turn degree adjustment mechanism is not provided.

An effect of the cooling unit 20 in this embodiment will be further described below. Since the temperature of the inner peripheral surface 5 of the fuel supply pipe 3 can be maintained at the softening temperature or lower of the low softening point petroleum pitch by the cooling mechanism, the solid (powdered) petroleum pitch is charged into the furnace of the boiler as it is along with a high-speed air flow without softening even after coming into contact with the fuel supply pipe 3. Additionally, even if the petroleum pitch softens more or less due to contact, it is never fixed. Therefore, it can be easily peeled off the inner surface of the fuel supply pipe by the high-speed air flow and charged into the furnace of the boiler.

Further, since the air flow forms a swirling flow in the fuel supply pipe 3 by the concentration adjusting unit, the petroleum pitch gathers on the outer peripheral portion due to centrifugal force, and therefore it comes into contact with the fuel supply pipe 3 at the outer peripheral portion of the fuel supply pipe. Accordingly, cooling the outer peripheral portion of the fuel supply pipe 3 is effective to prevent the petroleum pitch from softening and adhering due to contact with the fuel supply pipe 3. Thus, the effect of preventing the petroleum pitch from adhering to the supply pipe is increased by a superposing effect of the concentration adjusting mechanism and the cooling mechanism.

Additionally, although the low softening point petroleum pitch is generally poor in combustibility, the inverted low NOx boiler 2 can burn such fuel with poor combustibility with high efficiency and a low environmental load. Namely, the combustion system 1 according to this embodiment which combines the burner 100 comprising a water-cooling function with the inverted low NOx boiler 2 can burn the low softening point petroleum pitch stably with high efficiency and a low environmental load.

Particularly, in the combustion system 1 according to this embodiment, the temperature of the cylindrical main body portion 3A of the burner 100 is maintained lower than the softening point of the petroleum pitch by cooling and also the atmosphere temperature of the vicinity of the flame stabilizing plate 17 of the burner 100 is maintained higher than the softening point of the petroleum pitch, and therefore the entire temperature of the tip end side part of the burner 100 including the flame stabilizing plate 17 can be shifted from the softening point of the petroleum pitch to the higher temperature side or the lower temperature side even in the low-load operation of the boiler, for example.

Thereby, the combustion system 1 according to this embodiment can stably continue the combustion operation using the petroleum pitch fuel either in a rated operation of the boiler or in the low-load operation of the boiler.

Figure 6:
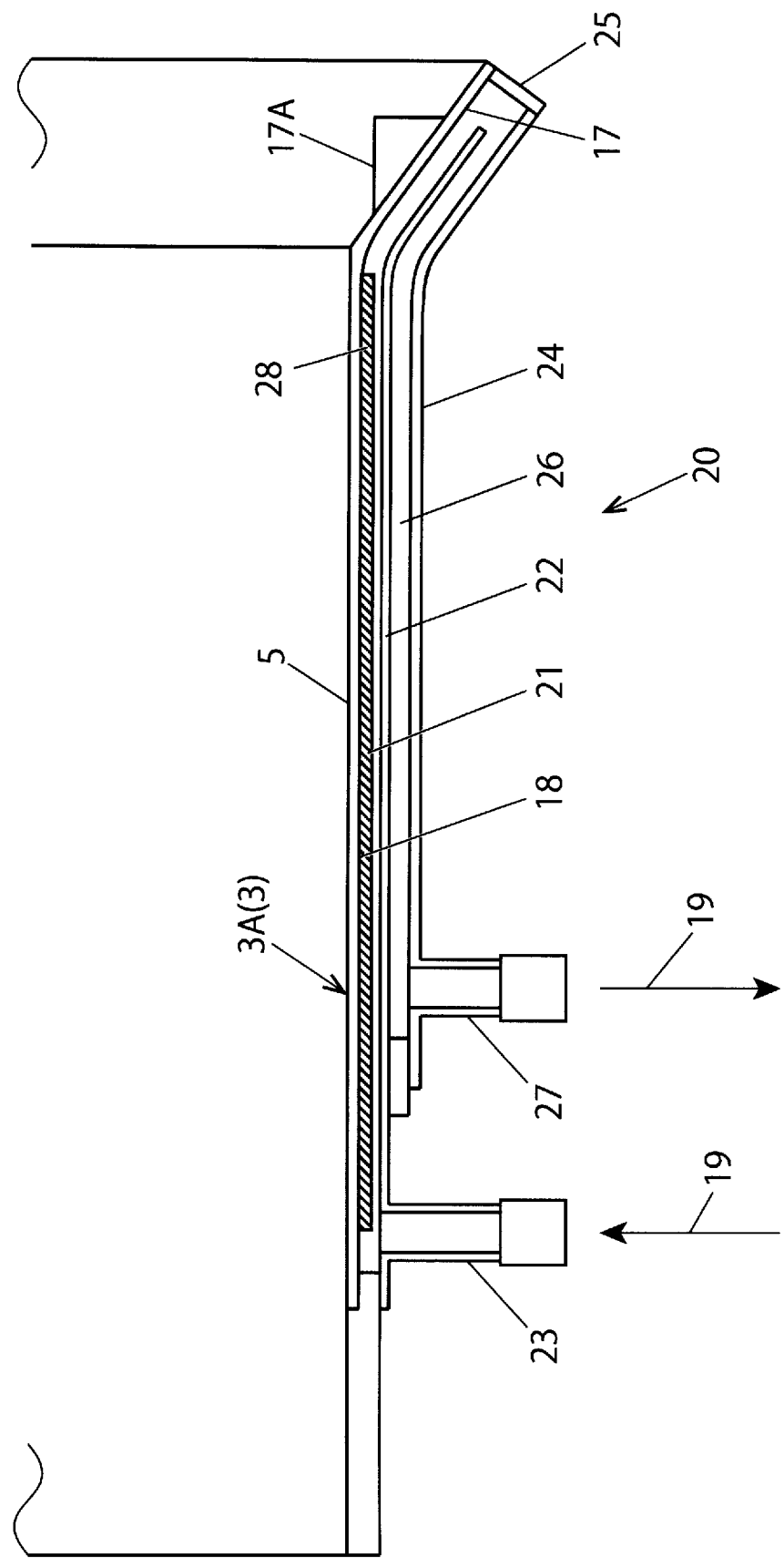
FIG. 6 is a partial longitudinal section view illustrating a variation of the burner for petroleum pitch fuel in FIG. 3.

Note that, as a variation of the above-stated embodiment, a cooling fin 28 may be provided in the cylindrical main body portion 3A of the fuel supply pipe 3 along the cooling material flow passage 21 as illustrated in FIG. 6 in order to improve cooling efficiency of the cooling unit 20.

Figure 7:
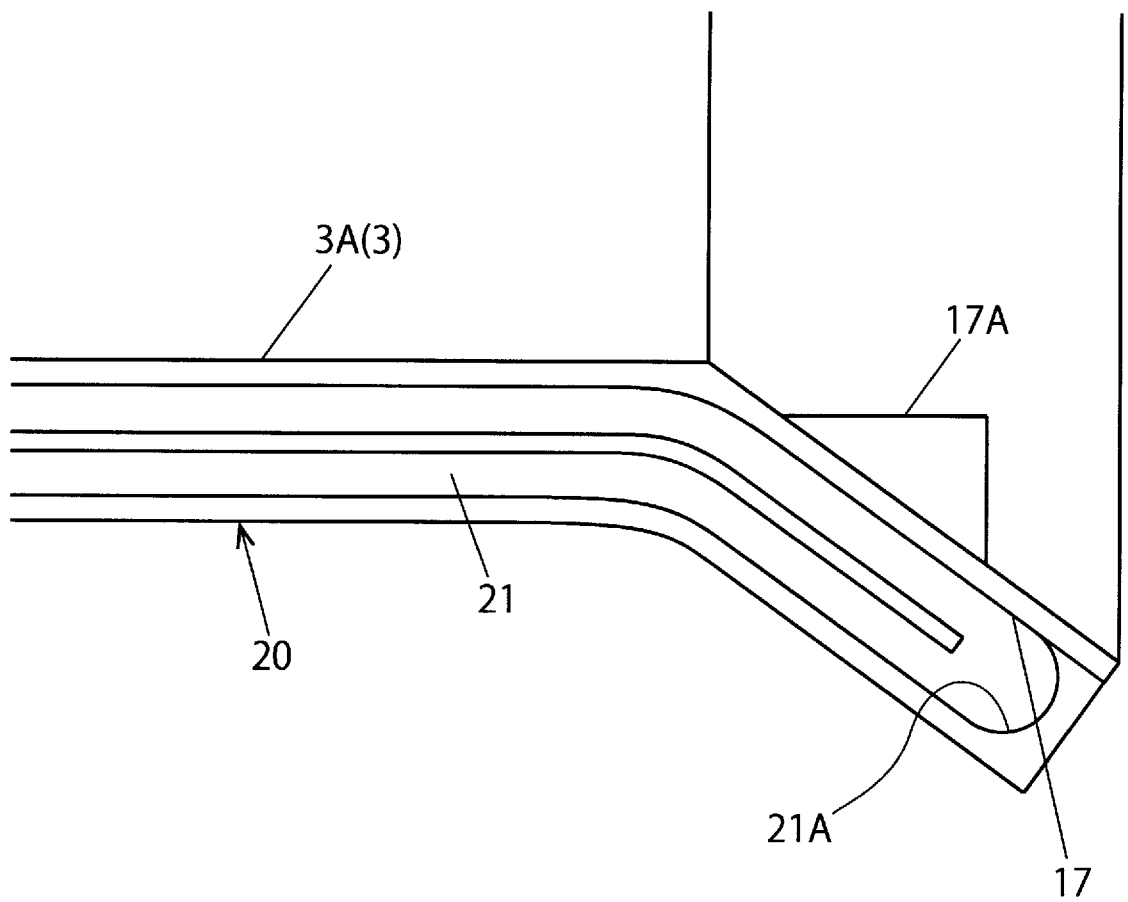
FIG. 7 is a partial longitudinal section view illustrating another variation of the burner for petroleum pitch fuel in FIG. 3.

Further, as another variation of the above-stated embodiment, as illustrated in FIG. 7, the form of an inner wall surface 21A of a folded portion of the cooling material flow passage 21 of the cooling unit 20 may be in a form that changes smoothly so that stagnation does not occur in the flow of the cooling material. When stagnation occurs in the flow of the cooling material, heat transfer is declined at the part, and thereby a hot spot is caused and the petroleum pitch easily adheres.

Accordingly, in this example, the inner wall surface 21A of the folded portion where stagnation easily occurs in the cooling material flow passage 21 is made into a smooth form so as to prevent a hot spot from occurring due to stagnation of the cooling material.

Note that, cooling effect by the cooling unit 20 can be further increased by combining the structure of this example illustrated in FIG. 7 and the structure of the cooling fin 28 illustrated in FIG. 6.

Figure 8:
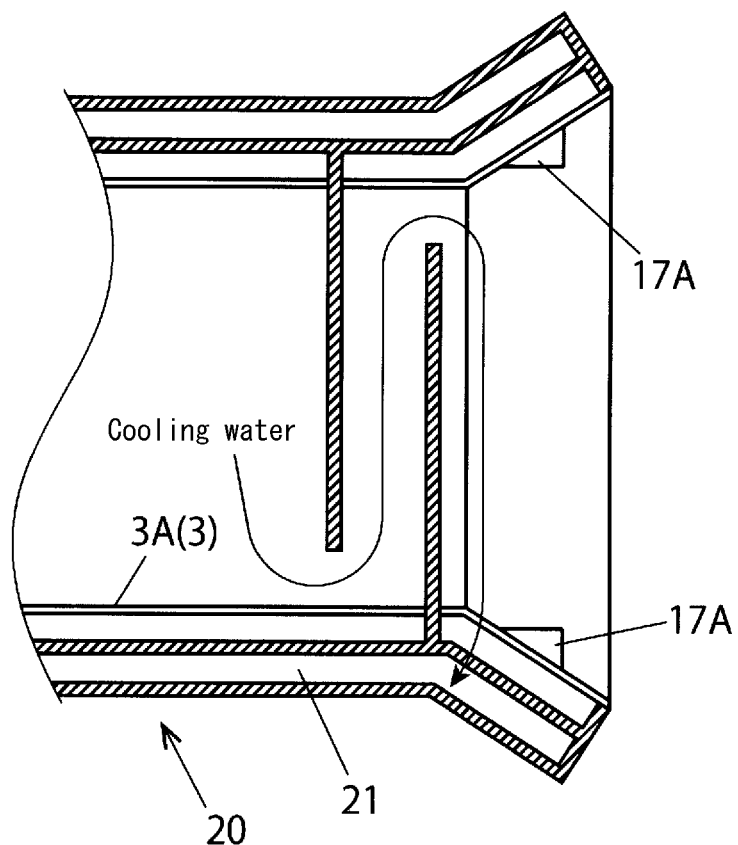
FIG. 8 is a partial longitudinal section view illustrating another variation of the burner for petroleum pitch fuel in FIG. 3.

Additionally, as another variation, the burner tip end portion may be made into a labyrinth structure in the cooling material flow passage 21 of the cooling unit 20, as illustrated in FIG. 8. As an inflow port of the cooling material into the labyrinth structure, a communicating hole (not illustrated) having a dimension (diameter) which is determined, provided that the cross section area of the cooling material flow passage 21 is constant, is formed in a flow passage wall of the cooling unit 20 in the burner tip end portion. In this example, two cooling material flow passages 21 are provided point-symmetrically.

When bias occurs in the flow of the cooling material in the cooling material flow passage 21, heat transfer is locally declined. However, by providing the labyrinth structure as illustrated in FIG. 8, the flow of the cooling material is not biased and occurrence of a hot spot can be prevented.

Note that, cooling effect by the cooling unit 20 can be further increased by combining the structure of this example illustrated in FIG. 8 and the structure of the cooling fin 28 illustrated in FIG. 6.

Additionally, as another variation, air may be used as a cooling medium and the cooling air may be discharged into the furnace as it is. For example, by combining the same with the cooling fin 28 illustrated in FIG. 6, air can maintain a sufficient cooling effect as a cooling medium, thereby achieving simplification of the cooling structure.

Additionally, another variation is a structure that only the burner tip end portion can be replaced, where the entire of the burner tip end portion may be replaced when the petroleum pitch adheres even after applying countermeasures such as the cooling unit and the like.

Figure 9:
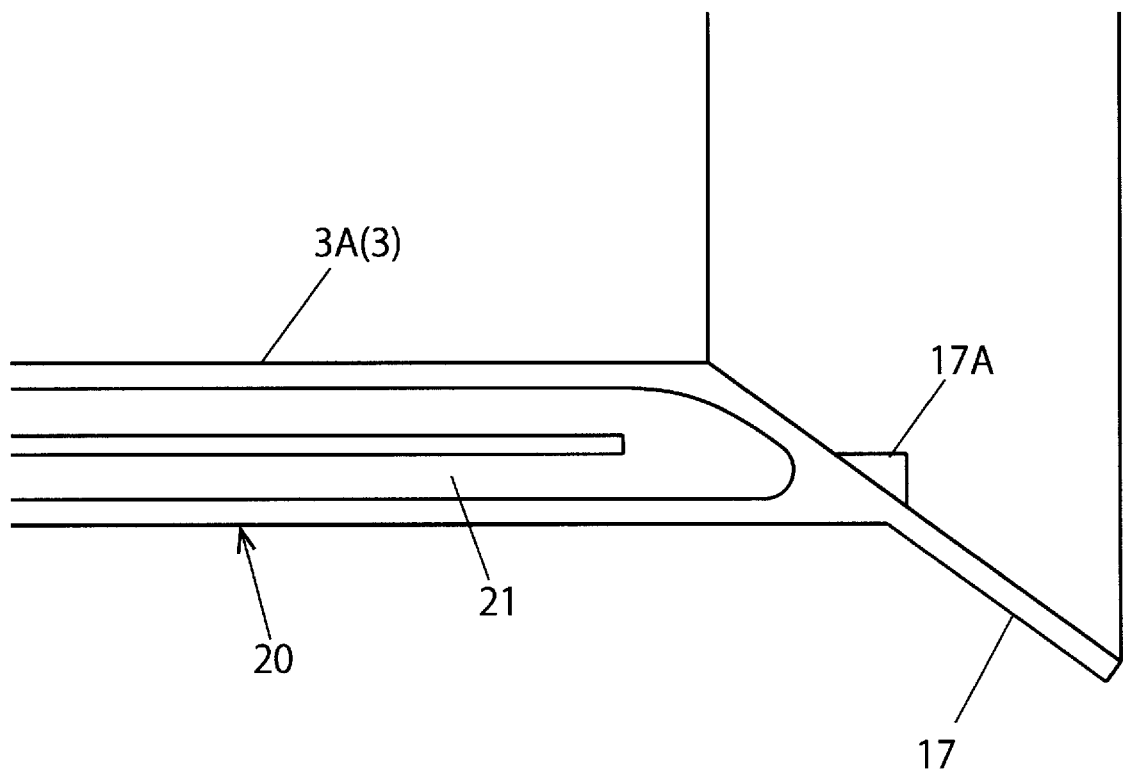
FIG. 9 is a partial longitudinal section view illustrating another variation of the burner for petroleum pitch fuel is FIG. 3.

Additionally, as another variation, the cooling material flow passage 21 may be formed up to the midway of the frame stabilizing plate 17 not over the entire of the same, thereby limiting cooling of the frame stabilizing plate 17. For example, as illustrated in FIG. 9, the folded portion of the cooling material flow passage 21 can be positioned at a base end portion of the frame stabilizing plate 17. Thereby, even when the softened petroleum pitch adheres to the inner peripheral surface of the flame stabilizing plate 17, the petroleum pitch is easily heated to the temperature higher than the softening point by the frame in the vicinity of the flame stabilizing plate 17 and removed from the flame stabilizing plate 17 due to decrease in viscosity.

DESCRIPTION OF REFERENCE NUMERALS

1 . . . combustion system
2 . . . inverted low NOx boiler
3 . . . fuel supply pipe
3A . . . cylindrical main body portion of fuel supply pipe
4 . . . tip end side part of fuel supply pipe
5 . . . inner wall surface of tip end side part of fuel supply pipe
6 . . . secondary fuel injection pipe
7 . . . injection pipe inserting pipe
8 . . . turning blade (swirler)
9 . . . petroleum pitch/transport gas
10 . . . secondary air
11 . . . secondary air supply mechanism
12 . . . turning blade (swirler)
13 . . . third air
14 . . . third air supply mechanism
15 . . . turning vane
16 . . . open space
17 . . . flame stabilizing plate
17A . . . annular step portion of inner peripheral surface of flame stabilizing plate
18 . . . outer wall surface of fuel supply pipe
19 . . . cooling material
20 . . . cooling unit
21 . . . cooling material flow passage
21A . . . inner wall surface of folded portion of cooling material flow passage
22 . . . inner side tubular member
23 . . . cooling material introduction port
24 . . . outer side annular member
25 . . . annular sealing member
26 . . . recirculation flow passage of cooling material
27 . . . cooling material discharge port
28 . . . cooling fin
100 . . . burner for petroleum pitch fuel
101 . . . combustion chamber
102 . . . high-temperature reducing combustion zone
103 . . . low-temperature oxidation combustion zone
104 . . . narrowing portion
105 . . . gas cooling zone
106 . . . fire resistant material
107 . . . secondary combustion air nozzle
108 . . . ash discharge port
109 . . . steam drum
110 . . . unheated water falling pipe
111 . . . gas outflow port
112 . . . gas conduction passage
113 . . . steam superheating pipe
114 . . . economizer
115 . . . ash discharge port

The invention claimed is:

1. A combustion system for a petroleum pitch fuel, comprising:
a burner having a fuel supply pipe where a flame stabilizing plate is formed in a tip end thereof; and
a high temperature maintaining unit configured to maintain an atmosphere temperature at a vicinity of the flame stabilizing plate during an operation higher than a softening point of the petroleum pitch fuel,
wherein the fuel supply pipe has a cylindrical main body portion where the flame stabilizing plate is formed at a front end thereof,
wherein the burner has a cooling unit configured to maintain a temperature of an inner peripheral surface of the cylindrical main body portion lower than the softening point of the petroleum pitch fuel, wherein the cooling unit maintains the temperature of the inner peripheral surface of the cylindrical main body portion of the fuel supply pipe at 100° C. or lower, wherein the cooling unit has a cooling material flow passage formed annularly around an outer wall surface of the fuel supply pipe, and wherein the cooling material flow passage extends up to a midway of the flame stabilizing plate, exceeding a front end of the cylindrical main body portion of the fuel supply pipe.

2. The combustion system according to claim 1, wherein the high temperature maintaining unit maintains the atmosphere temperature at a vicinity of the flame stabilizing plate during an operation at 400° C. or higher.

3. The combustion system according to claim 1, wherein the high temperature maintaining unit has a fire resistant material surrounding a combustion region where the burner is placed.

4. The combustion system according to claim 1, wherein the high temperature maintaining unit is configured by arranging one burner and an other burner so that a flame of the one burner heats a vicinity of the flame stabilizing plate of the other burner.

5. The combustion system according to claim 1, wherein the flame stabilizing plate is formed so as to expand outward in a radial direction toward a tip end side of the burner.

6. The combustion system according to claim 5, wherein an annular step portion for influencing a flow of a gas which transports a fuel so as to improve a combustion efficiency is formed on an inner peripheral surface of the flame stabilizing plate.

7. The combustion system according to claim 1, wherein the burner is arranged in a high-temperature reducing combustion zone of an inverted low NOx boiler.

8. The combustion system according to claim 1, wherein the burner has a fuel concentration adjusting unit which is provided at an upstream side of the fuel supply pipe so as to intensively concentrate a fuel on an inner peripheral wall side of the fuel supply pipe and also make a concentration distribution of the fuel uniform in a peripheral direction of the fuel supply pipe.

9. The combustion system according to claim 1, wherein an open space having no obstacle disturbing a flow of a gas which transports a fuel is formed inside a tip end side part of the fuel supply pipe excluding the flame stabilizing plate.

10. The combustion system according to claim 1, wherein at least a part of an inner wall surface of the fuel supply pipe is electropolished.

* * * * *